(12) United States Patent
Dailey et al.

(10) Patent No.: US 9,999,845 B2
(45) Date of Patent: Jun. 19, 2018

(54) SYSTEM AND METHOD FOR DE-AERATING COOLANT IN CLOSED COOLANT SYSTEM

(71) Applicant: GM GLOBAL TECHNOLOGY OPERATIONS LLC, Detroit, MI (US)

(72) Inventors: Michael K. Dailey, Fowlerville, MI (US); Rolf B. Karlsson, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 446 days.

(21) Appl. No.: 14/686,107

(22) Filed: Apr. 14, 2015

(65) Prior Publication Data

US 2016/0303493 A1 Oct. 20, 2016

(51) Int. Cl.
*B01D 19/00* (2006.01)

(52) U.S. Cl.
CPC ..... *B01D 19/0073* (2013.01); *B01D 19/0042* (2013.01); *B01D 19/0068* (2013.01)

(58) Field of Classification Search
CPC ............ B01D 19/0073; B01D 19/0042; B01D 19/0068; F01P 11/028
See application file for complete search history.

(56) References Cited

U.S. PATENT DOCUMENTS

| | | | | |
|---|---|---|---|---|
| 2,482,806 A * | 9/1949 | Stahn | ..................... | F01M 5/007 |
| | | | | 184/6.23 |
| 2,952,329 A * | 9/1960 | Cunningham | ..... | B01D 19/0052 |
| | | | | 96/174 |
| 3,722,212 A * | 3/1973 | Stein | ......................... | F02C 7/14 |
| | | | | 184/6.11 |
| 6,216,646 B1 * | 4/2001 | Smith | .................... | F01P 11/029 |
| | | | | 123/41.54 |
| 2005/0184132 A1 * | 8/2005 | Shabtay | ............... | B23K 1/0012 |
| | | | | 228/183 |
| 2007/0215073 A1 * | 9/2007 | Lawrence | .............. | F01P 11/028 |
| | | | | 123/41.54 |
| 2009/0211552 A1 * | 8/2009 | Prior | ........................ | F01M 1/12 |
| | | | | 123/196 R |
| 2010/0031901 A1 * | 2/2010 | Dahl | ...................... | F01P 11/028 |
| | | | | 123/41.05 |
| 2010/0229823 A1 * | 9/2010 | Gibson | .................... | F01M 1/12 |
| | | | | 123/196 R |
| 2013/0327511 A1 * | 12/2013 | Johnston | ................... | F28F 9/02 |
| | | | | 165/173 |

* cited by examiner

*Primary Examiner* — Tho V Duong
(74) *Attorney, Agent, or Firm* — Quinn IP Law

(57) ABSTRACT

A method of removing entrained air from a coolant in a coolant system that may not include a fluid reservoir, includes connecting a de-aeration tank to the coolant system. The de-aeration tank is connected in fluid communication to the coolant system in parallel with a heat exchanger, such that a first connection device connects the de-aeration tank to the coolant system upstream of the heat exchanger, and a second connection device connects the de-aeration tank to the coolant system downstream of the heat exchanger. The coolant is circulated from the coolant system, through the de-aeration tank, and back to the coolant system, with a pump, until substantially all entrained air is removed from the coolant. The de-aeration tank may then be disconnected from the coolant system.

11 Claims, 2 Drawing Sheets

SYSTEM AND METHOD FOR DE-AERATING COOLANT IN CLOSED COOLANT SYSTEM

TECHNICAL FIELD

The disclosure generally relates to a method of removing entrained air from a coolant in a closed coolant system of a vehicle.

BACKGROUND

Vehicles include one or more closed coolant systems that circulate a coolant therethrough. For example, vehicles include a high temperature engine cooling system that circulates an engine coolant for cooling an internal combustion engine. Additionally, some vehicles may include a low temperature closed coolant system for cooling some other component of the vehicle, such as an intercooler for cooling compressed air from a turbo charger and/or a super charger.

If the closed coolant system is equipped with a reservoir/settling tank, such as is typically the case for an engine cooling system, then any air that is entrained in the coolant may settle out of the coolant in the reservoir. However, if the closed coolant system does not include a reservoir/settling tank, then any air entrained in the coolant is trapped in the coolant, and cannot settle out or otherwise separate from the coolant. Removing any entrained air from the coolant improves the heat transfer, and reduces "gurgling" noises caused by the coolant circulating through the closed coolant system.

SUMMARY

A method of removing entrained air from a coolant in a coolant system of a vehicle is disclosed. The method includes connecting a service inlet line to the closed coolant system at a first connection device of the closed coolant system, disposed upstream of a first heat exchanger, to supply a de-aeration tank with the coolant. A service outlet line is connected to the closed coolant system at a second connection device of the closed coolant system, disposed downstream of the first heat exchanger, to return the coolant from the de-aeration tank back to the closed coolant system. The coolant is circulated from the closed coolant system, through the de-aeration tank, and back to the closed coolant system, with a pump, until substantially all entrained air is removed from the coolant. Circulating the coolant through the de-aeration tank includes inletting the coolant from the service inlet line into the de-aeration tank at a first tank elevation, and outletting the coolant from the de-aeration tank to the service outlet line at a second tank elevation. The second tank elevation is lower than the first tank elevation, thereby allowing any entrained air in the coolant to settle out of the coolant before the coolant is circulated back to the closed coolant system through the second connection device. The service inlet line and the service outlet line are then disconnected from the closed coolant system once all of the entrained air in the coolant has been removed.

A closed coolant system for a vehicle is also provided. The closed coolant system includes a first heat exchanger having an upstream input and a downstream output. A first connection device is disposed adjacent and in fluid communication with the upstream input. A second connection device is disposed adjacent and in fluid communication with the downstream output. A pump is operable to circulate a coolant through the first heat exchanger. A fluid circuit interconnects the first heat exchanger and the pump in fluid communication, and includes the first connection device and the second connection device. The closed coolant system does not include a fluid reservoir.

Accordingly, the first connection device and the second connection device allow the de-aeration tank to be connected to the closed coolant system. By circulating the coolant through the de-aeration tank, any entrained air trapped in the coolant is allowed to separate and settle out, thereby removing the entrained air from the coolant. This configuration allows the closed coolant system to be designed and built without a permanent fluid reservoir and/or settling tank, and the associated plumbing required to connect them to the closed coolant system, while still providing an efficient coolant system.

The above features and advantages and other features and advantages of the present teachings are readily apparent from the following detailed description of the best modes for carrying out the teachings when taken in connection with the accompanying drawings.

DETAILED DESCRIPTION

Figure 1:
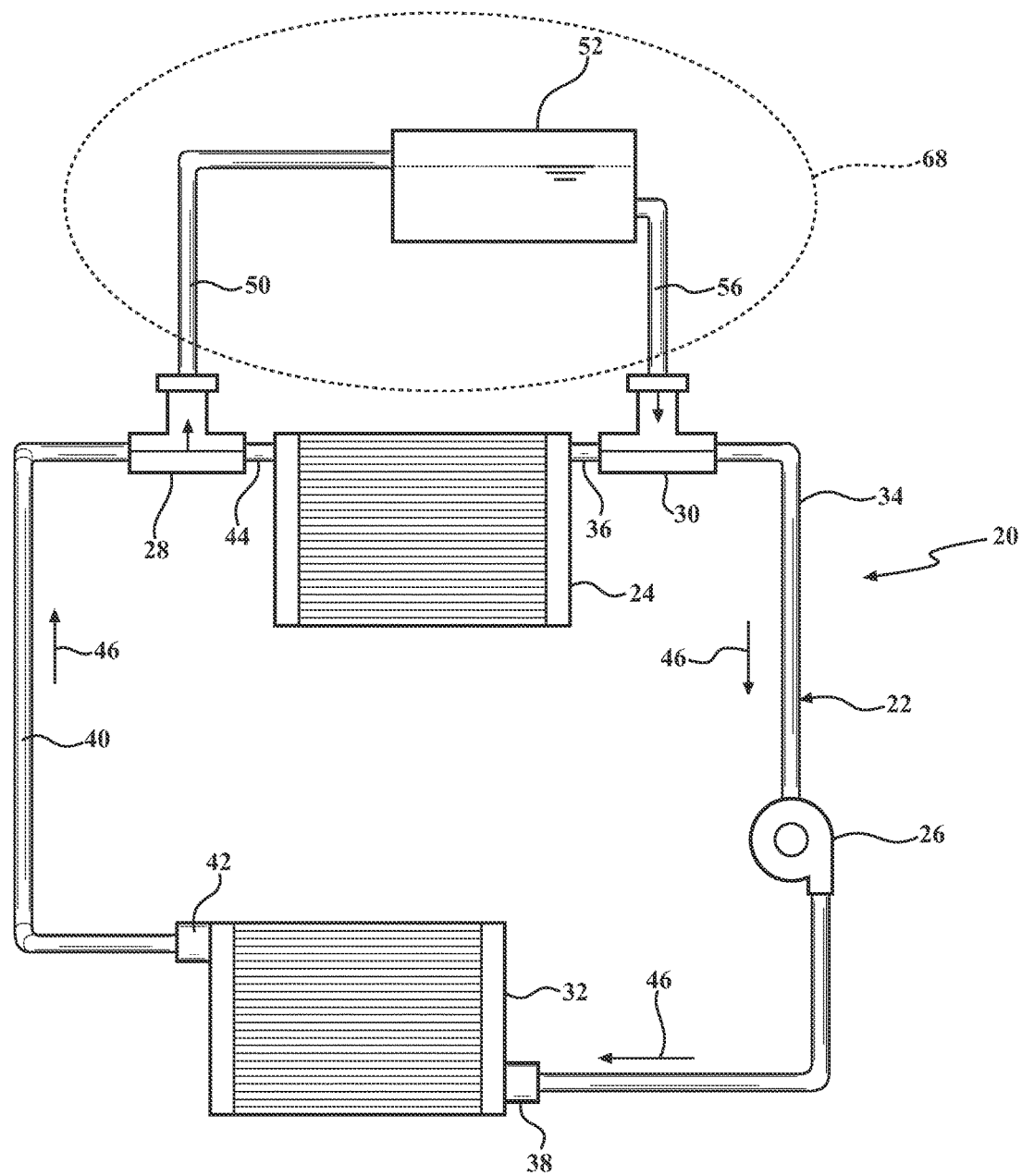
FIG. 1 is a schematic plan view of a closed coolant system for a vehicle.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a closed coolant system is generally shown at 20. The closed coolant system 20 is for a vehicle, such as but not limited to a car, truck, tractor, etc. The closed coolant system 20 is operable to cool or maintain a temperature of one or more vehicular components, described in greater detail below.

The closed coolant system 20 includes a fluid circuit 22. The fluid circuit 22 includes multiple components and the required fluid lines, connections, fittings, adapters, etc., necessary to connect the various components in fluid communication. When complete, the fluid circuit 22 defines a sealed fluid path through which a coolant, i.e., a fluid, circulates. The fluid circuit 22 interconnects a first heat exchanger 24, a pump 26, a first connection device 28, and a second connection device 30 in fluid communication. The fluid circuit 22 may further include, in addition to other components not described herein, a second heat exchanger 32.

Figure 2:
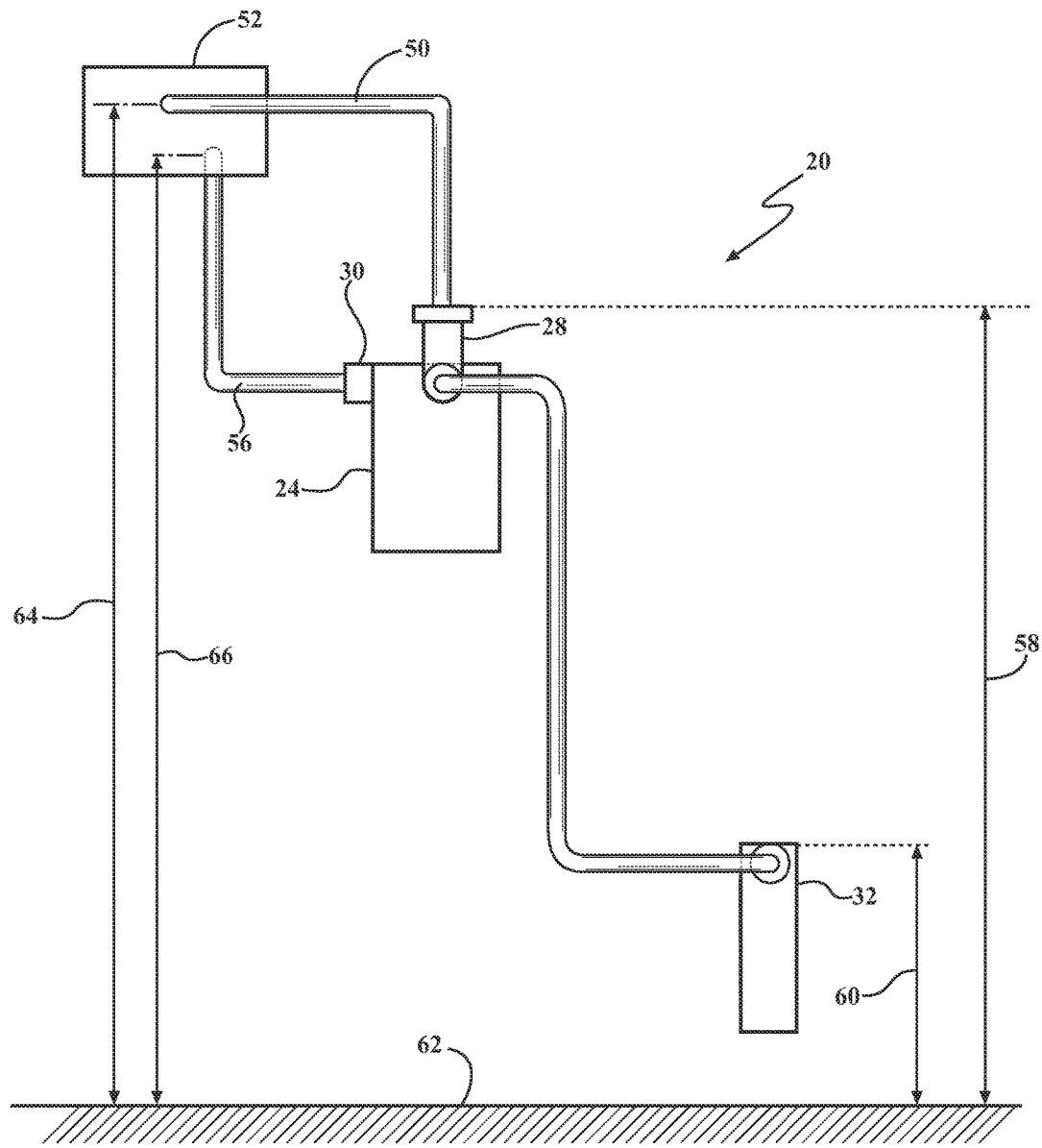
FIG. 2 is a schematic elevation view of the closed coolant system.

As shown in FIGS. 1 and 2, the closed coolant system 20 includes the first heat exchanger 24, the pump 26, and the second heat exchanger 32. The closed coolant system 20 shown in the Figures may be described as a low temperature cooling system, which is designed to maintain the temperature of the coolant at or below a boiling temperature. The low temperature cooling system is intended for use with a component of the vehicle, such as but not limited to an intercooler (not shown) for a turbo charger and/or super charger of an air induction system. However, it should be appreciated that the teachings of the disclosure may be incorporated into other types of closed coolant systems, such as but not limited to an engine cooling system used to cool an internal combustion engine, a battery cooling system, an electronics (e.g., inverter) cooling system, a gearbox cooling system, etc.

The pump 26 is operable to circulate the coolant through the fluid circuit 22, including the first heat exchanger 24 and the second heat exchanger 32 (if the closed coolant system 20 is so equipped). The pump 26 may include any suitable style and/or configuration capable of pressurizing and moving the coolant through the fluid circuit 22. For example, the pump 26 may include but is not limited to an electric pump or a mechanical pump connected to and driven by an engine of the vehicle.

As noted above, the fluid circuit 22 may include several different fluid lines for connecting the various components of the closed coolant system 20. For example and as shown in FIG. 1, the fluid circuit 22 includes a first line 34 interconnecting a downstream output 36 of the first heat exchanger 24 and an intake 38 of the second heat exchanger 32 in fluid communication. The fluid circuit 22 further includes a second line 40 interconnecting an outtake 42 of the second heat exchanger 32 and an upstream input 44 of the first heat exchanger 24 in fluid communication. The pump 26 is disposed in one of either the first line 34 or the second line 40 of the fluid circuit 22. As shown, the pump 26 is disposed in the first line 34. Notably, the closed coolant system 20 does not include a fluid reservoir or settling tank as part of the fluid circuit 22. It should be appreciated that the schematic embodiment of the closed coolant system 20 shown in FIGS. 1 and 2 is only exemplary, and may differ from the Figures and description herein.

The first heat exchanger 24 includes the upstream input 44 and the downstream output 36 described above. During operation, the coolant circulates through the fluid circuit 22 in a flow direction, indicated by arrow 46. The upstream input 44 of the first heat exchanger 24 is defined herein as the fluid input into the first heat exchanger 24 through which the coolant enters the first heat exchanger 24 when circulating in the flow direction 46. The downstream output 36 of the first heat exchanger 24 is defined herein as the fluid output of the first heat exchanger 24 through which the coolant exits the first heat exchanger 24 when circulating in the flow direction 46.

The first connection device 28 is disposed adjacent to and in fluid communication with the upstream input 44 of the first heat exchanger 24. Accordingly, the first connection device 28 is disposed upstream of the first heat exchanger 24 of the closed coolant system 20, relative to the flow direction 46 of the coolant in the fluid circuit 22. The first connection device 28 provides a connection or coupling to attach a fluid line to the fluid circuit 22 of the closed coolant system 20. Preferably, the first connection device 28 includes a quick connect fluid coupling, such as but not limited to a Shraeder valve or equivalent. The first connection device 28 is used to connect a service inlet line 50 of a de-aeration tank 52 to the fluid circuit 22 of the closed coolant system 20.

The second connection device 30 is disposed adjacent to and in fluid communication with the downstream output 36 of the first heat exchanger 24. Accordingly, the second connection device 30 is disposed downstream of the first heat exchanger 24 of the closed coolant system 20, relative to the flow direction 46 of the coolant in the fluid circuit 22. The second connection device 30 provides a connection or coupling to attach a fluid line to the fluid circuit 22 of the closed coolant system 20. Preferably, the second connection device 30 includes a quick connect fluid coupling, such as but not limited to a Shraeder valve or equivalent. The second connection device 30 is used to connect a service outlet line 56 of the de-aeration tank 52 to the fluid circuit 22 of the closed coolant system 20. Preferably, but not necessarily, one of the first connection device 28 and the second connection device 30 includes and/or defines a system fill port, through which the coolant is introduced into the closed coolant system 20.

Referring to FIG. 2, the first heat exchanger 24, and more specifically the first connection device 28 and the second connection device 30 disposed adjacent to the first heat exchanger 24, are disposed at a first system elevation 58. The second heat exchanger is disposed at a second system elevation 60. The first system elevation 58 is higher than the second system elevation 60, so that the connections to the fluid circuit 22 at the first connection device 28 and the second connection device 30 are made at the highest relative elevation of the closed coolant system 20. The first system elevation 58 and the second system elevation 60 may be defined as the vertical height above a reference plane. The reference plane may include, for example, a ground surface 62. As such, the first system elevation 58 is disposed farther or higher from the ground surface 62 than the second system elevation 60.

As shown in the Figures, the coolant system 20 does not include a reservoir or settling tank. However, other embodiments of the coolant system 20 may include a reservoir. As used herein, the term "reservoir" is defined as a storage container capable of receiving and storing excess coolant from the coolant system 20 when the coolant is heated and/or pressurized, and automatically providing the coolant back to the coolant system 20 as the coolant in the coolant system 20 cools. The inclusion of a reservoir in the coolant system 20 allows air entrained in the coolant to separate from the coolant and rise to the top of the reservoir. However, because some embodiments of the closed coolant system 20 may not include a reservoir or settling tank as part of the fluid circuit 22, any air that is entrained or otherwise trapped or suspended in the coolant is more likely to remain entrained in the coolant, and is unable to escape during the normal operation of the closed coolant system 20. A method of removing entrained air from the coolant in the closed coolant system 20, is described below. Although the method described below is particularly useful for coolant systems that do not include a fluid reservoir, it should be appreciated that the method may be practiced with coolant systems that do include a reservoir.

The method of removing the entrained air from the coolant in the closed coolant system 20 includes connecting the de-aeration tank 52 to the closed coolant system 20, in fluid communication with the fluid circuit 22 of the closed coolant system 20. Connecting the de-aeration tank 52 to the closed coolant system 20 includes connecting the service inlet line 50 to the closed coolant system 20 at the first connection device 28 of the closed coolant system 20, upstream of the first heat exchanger 24, to supply the de-aeration tank 52 with the coolant. Additionally, connecting the de-aeration tank 52 to the closed coolant system 20 includes connecting the service outlet line 56 to the closed coolant system 20 at the second connection device 30 of the closed coolant system 20, downstream of the first heat exchanger 24, to return the coolant from the de-aeration tank 52 back to the closed coolant system 20.

The service inlet line 50, the de-aeration tank 52, and the service outlet line 56 form a service loop 68, with the de-aeration tank 52 disposed in a parallel fluid relationship with the first heat exchanger 24. A parallel fluid relationship is defined herein as having two different fluid flow paths between two locations, or a fluid circuit 22 or path in which the fluid flow is divided into two or more paths and then returned to a single flow path to complete the circuit. Accordingly, coolant circulating in the flow direction 46 may flow through the service loop 68, i.e., a first fluid path, or through the first heat exchanger 24, i.e., a second fluid path. However, the first heat exchanger 24 naturally provides a resistance to flow that is greater than the service loop 68. As such, a portion of the coolant is directed through the service loop 68, while the balance of the flow of the coolant will flow through the first heat exchanger 24, to further move air entrained in the coolant into the de-aeration tank 52. Additionally, any air trapped within the fluid circuit 22 will naturally rise to the highest elevation of the closed coolant system 20. Because the first heat exchanger 24, and more specifically, the first connection device 28, is disposed at the highest relative elevation of the closed coolant system 20, i.e., the first system elevation 58, air trapped within the fluid circuit 22 of the closed coolant system 20 is drawn into the service loop 68 and through the de-aeration tank 52.

The method further includes circulating the coolant from the closed coolant system 20, through the de-aeration tank 52, and back to the closed coolant system 20. The coolant is circulated through the de-aeration tank 52 with the pump 26 of the closed coolant system 20. As such, the process of removing the entrained air from the closed coolant system 20 does not require a specialized pump, but instead, uses the existing pump 26 of the closed coolant system 20. The pump 26 circulates the coolant through the de-aeration tank 52 until substantially all entrained air is removed from the coolant.

Referring to FIG. 2, circulating the coolant through the de-aeration tank 52 includes inletting the coolant from the service inlet line 50 into the de-aeration tank 52 at a first tank elevation 64. The coolant is discharged from the de-aeration tank 52 to the service outlet line 56 at a second tank elevation 66. The second tank elevation 66 is lower than the first tank elevation 64. Accordingly, any air that is entrained in the coolant may separate from the coolant and rise to the top of the de-aeration tank 52, such that only coolant without any entrained air flows out of the service outlet line 56. As shown in FIG. 2, the de-aeration tank 52 is positioned vertically above, i.e., at a higher elevation, than the first heat exchanger 24, so that any air in the fluid circuit 22 may rise to the top of the de-aeration tank 52. The first tank elevation 64 and the second tank elevation 66 may be defined as the vertical height above a reference plane. The reference plane may include, for example, the ground surface 62 used to reference the first system elevation 58 and the second system elevation 60. As such, the first tank elevation 64 is disposed farther or higher from the ground surface 62 than the second tank elevation 66. Additionally, the first tank elevation 64 is higher than the first system elevation 58.

Once the coolant has been circulated through the de-aeration tank 52, such that substantially all of the entrained air has been removed from the coolant, the de-aeration tank 52 is disconnected from the closed coolant system 20. The first connection device 28 and the second connection device 30 limit or prevent air from entering the fluid circuit 22 of the closed coolant system 20 when the service inlet line 50 and the service outlet line 56 are disconnected from the first connection device 28 and the second connection device 30 respectively.

The closed coolant system 20 described above, including the first connection device 28 disposed upstream of the first heat exchanger 24, and the second connection device 30 disposed downstream of the first heat exchanger 24, enables the method of removing the entrained air, described above, by circulating the coolant through the de-aeration tank 52.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of removing entrained air from a coolant in a coolant system of a vehicle, the method comprising:
   connecting a de-aeration tank in fluid communication to the closed coolant system, wherein connecting the de-aeration tank to the closed coolant system includes:
      connecting a service inlet line to the closed coolant system at a first connection device of the closed coolant system to supply the de-aeration tank with the coolant, wherein the first connection device is disposed upstream of a first heat exchanger of the closed coolant system; and
      connecting a service outlet line to the closed coolant system at a second connection device of the closed coolant system to return the coolant from the de-aeration tank back to the closed coolant system;
   circulating the coolant from the closed coolant system, through the de-aeration tank, and back to the closed coolant system until substantially all entrained air is removed from the coolant, wherein circulating the coolant through the de-aeration tank includes inletting the coolant from the service inlet line into the de-aeration tank at a first tank elevation, and outletting the coolant from the de-aeration tank to the service outlet line at a second tank elevation, wherein the second tank elevation is lower than the first tank elevation; and
   disconnecting the de-aeration tank from the closed coolant system.

2. The method set forth in claim 1 wherein the first connection device includes a quick connect valve.

3. The method set forth in claim 1 wherein the second connection device includes a quick connect valve.

4. The method set forth in claim 1 wherein the second connection device is disposed downstream of the first heat exchanger.

5. The method set forth in claim 4 wherein the de-aeration tank is disposed in parallel with the first heat exchanger.

6. The method set forth in claim 1 wherein the first heat exchanger is disposed at a first system elevation, and the closed coolant system includes a second heat exchanger disposed at a second system elevation, and wherein the first system elevation is higher than the second system elevation.

7. The method set forth in claim 1 wherein one of the first connection device and the second connection device include a system fill port operable to fill the closed coolant system with the coolant.

8. The method set forth in claim 1 wherein circulating the coolant is further defined as circulating the coolant with a pump.

9. The method set forth in claim 1 wherein the coolant system includes a closed coolant system not including a fluid reservoir.

10. A method of removing entrained air from a coolant in a coolant system of a vehicle, the method comprising:
   connecting a service inlet line to the closed coolant system at a first connection device of the closed coolant system, disposed upstream of a first heat exchanger, to supply a de-aeration tank with the coolant;
   connecting a service outlet line to the closed coolant system at a second connection device of the closed coolant system, disposed downstream of the first heat exchanger, to return the coolant from the de-aeration tank back to the closed coolant system;
   circulating the coolant from the closed coolant system, through the de-aeration tank, and back to the closed coolant system, with a pump, until substantially all entrained air is removed from the coolant;
   wherein circulating the coolant through the de-aeration tank includes inletting the coolant from the service inlet line into the de-aeration tank at a first tank elevation, and outletting the coolant from the de-aeration tank to the service outlet line at a second tank elevation, wherein the second tank elevation is lower than the first tank elevation; and
   disconnecting the service inlet line and the service outlet line from the closed coolant system.

11. The method set forth in claim 10 wherein the first heat exchanger is disposed at a first system elevation, and the closed coolant system includes a second heat exchanger disposed at a second system elevation, and wherein the first system elevation is higher than the second system elevation.

\* \* \* \* \*